United States Patent
Hong et al.

(10) Patent No.: US 10,769,811 B2
(45) Date of Patent: Sep. 8, 2020

(54) SPACE COORDINATE CONVERTING SERVER AND METHOD THEREOF

(71) Applicant: Institute For Information Industry, Taipei (TW)

(72) Inventors: Jia-Wei Hong, Taichung (TW); Shih-Kai Huang, New Taipei (TW); Ming-Fang Weng, Kinmen County (TW); Ching-Wen Lin, New Taipei (TW)

(73) Assignee: Institute For Information Industry, Taipei (TW)

( * ) Notice: Subject to any disclaimer, the term of this patent is extended or adjusted under 35 U.S.C. 154(b) by 295 days.

(21) Appl. No.: 16/049,798

(22) Filed: Jul. 30, 2018

(65) Prior Publication Data
US 2020/0013187 A1 Jan. 9, 2020

(30) Foreign Application Priority Data
Jul. 9, 2018 (TW) .............. 107123709 A

(51) Int. Cl.
| G06K 9/00 | (2006.01) |
| G06T 7/73 | (2017.01) |
| G01B 11/00 | (2006.01) |
| G06K 9/62 | (2006.01) |

(52) U.S. Cl.
CPC .............. G06T 7/74 (2017.01); G01B 11/002 (2013.01); G06K 9/00214 (2013.01); G06K 9/6211 (2013.01); G06T 2207/10028 (2013.01)

(58) Field of Classification Search
USPC ........................................ 382/154
See application file for complete search history.

(56) References Cited

FOREIGN PATENT DOCUMENTS

CN    102169579 A    8/2011

*Primary Examiner* — Stephen P Coleman
(74) *Attorney, Agent, or Firm* — Skaar Ulbrich Macari, P.A.

(57) ABSTRACT

A space coordinate converting server and method thereof are provided. The space coordinate converting server receives a field video recorded with a 3D object from an image capturing device, and generates a point cloud model accordingly. The space coordinate converting server determines key frames of the field video, and maps the point cloud model to key images of the key frames based on rotation and translation information of the image capturing device for generating a characterized 3D coordinate set. The space coordinate converting server determines 2D coordinates of the 3D object in key images, and selects 3D coordinates from the characterized 3D coordinate set according to the 2D coordinates. The space coordinate converting server determines a space coordinate converting relation according to marked points of the 3D object and the 3D coordinates.

12 Claims, 5 Drawing Sheets

```
┌─────────────────────────────────────────────────────────────────┐
│ The space coordinate converting server receives a field video from an image │
│ capturing device while the field video is recorded with a 3D object and the 3D │
│ object has a plurality of marked points                     301 │
└─────────────────────────────────────────────────────────────────┘
                                  ↓
┌─────────────────────────────────────────────────────────────────┐
│ The space coordinate converting server generates a point cloud model │
│ according to the field video while the point cloud model comprises a plurality │
│ of points data.                                             302 │
└─────────────────────────────────────────────────────────────────┘
                                  ↓
┌─────────────────────────────────────────────────────────────────┐
│ The space coordinate converting server determines a plurality of key frames of │
│ the field video while each of the plurality of key frames comprises a key image │
│ and a rotation and translation information of the image capturing device │
│                                                             303 │
└─────────────────────────────────────────────────────────────────┘
                                  ↓
┌─────────────────────────────────────────────────────────────────┐
│ The space coordinate converting server maps the plurality of points data of the │
│ point cloud model to the key image of each of the plurality of key frames │
│ based on the corresponding rotation and translation information of the image │
│ capturing device of each of the plurality of key frames for generating a 3D │
│ coordinate set corresponding to the key image of each of the plurality of key │
│ frames                                                      304 │
└─────────────────────────────────────────────────────────────────┘
                                  ↓
┌─────────────────────────────────────────────────────────────────┐
│ The space coordinate converting server determines a plurality of 2D │
│ coordinates of the 3D object in the key image of each of the plurality of key │
│ frames based on the plurality of marked points while the plurality of 2D │
│ coordinates correspond to at least two marked points of the plurality of marked │
│ points                                                      305 │
└─────────────────────────────────────────────────────────────────┘
                                  ↓
┌─────────────────────────────────────────────────────────────────┐
│ The space coordinate converting server selects a plurality of 3D coordinates │
│ from the 3D coordinate set according to the plurality of 2D coordinates while │
│ the plurality of 3D coordinates correspond to the at least two marked points │
│                                                             306 │
└─────────────────────────────────────────────────────────────────┘
                                  ↓
┌─────────────────────────────────────────────────────────────────┐
│ The space coordinate converting server determines a space coordinate │
│ converting relation according to actual point coordinates of the at least two │
│ marked points and the plurality of 3D coordinates           307 │
└─────────────────────────────────────────────────────────────────┘
```

FIG. 3

The space coordinate converting server receives a field video from an image capturing device while the field video is recorded with a 3D object and the 3D object has a plurality of marked points  401

The space coordinate converting server generates a point cloud model according to the field video based on SLAM technology while the point cloud model comprises a plurality of points data  402

The space coordinate converting server determines a plurality of key frames of the field video while each of the plurality of key frames comprises a key image and a rotation and translation information of the image capturing device  403

The space coordinate converting server maps the plurality of points data of the point cloud model to the key image of each of the plurality of key frames based on the corresponding rotation and translation information of the image capturing device of each of the plurality of key frames for generating a 3D coordinate set corresponding to the key image of each of the plurality of key frames  404

The space coordinate converting server determines a plurality of 2D coordinates of the 3D object in the key image of each of the plurality of key frames based on the plurality of marked points while the plurality of 2D coordinates correspond to at least two marked points of the plurality of marked points  405

The space coordinate converting server selects a plurality of 3D coordinates from the 3D coordinate set according to the plurality of 2D coordinates while the plurality of 3D coordinates correspond to the at least two marked points  406

SPACE COORDINATE CONVERTING SERVER AND METHOD THEREOF

PRIORITY

This application claims priority to Taiwan Patent Application No. 107123709 filed on Jul. 9, 2018, which is hereby incorporated by reference in its entirety.

FIELD

The present invention relate to a space coordinate converting server and method. More particularly, the present invention relate to a space coordinate converting server and method for mapping the coordinates of the virtual space and the coordinates of the actual space.

BACKGROUND

Virtual Reality (VR), Augmented Reality (AR), and Mixed Reality (MR) are very popular technologies in the field of image processing, computer vision and computer graphics currently, and they provide highly realistic user experience through virtual environment or the combination of virtual environment and actual environment.

In AR/MR technology, it is common to scan the objects or the scenes in real environment and then generate a model of virtual environment for further application. However, there are often inconsistency between the space coordinates of the generated virtual environment and the space coordinates of the real environment. Thus, for spaces mapping purpose, steps of converting and aligning space coordinates are necessary. Yet, the inaccuracies of converting and aligning space coordinates are still significant in the current technologies. Therefore, it may cause obvious errors when applying the AR/MR technology.

Accordingly, an urgent need exists in the art to decrease the inaccuracies of converting and aligning space coordinates and increase the accuracy of space mapping, thereby avoiding the errors in the AR/MR technology.

SUMMARY

The disclosure includes a space coordinate converting method for a space coordinate converting server. The method comprises: receiving, by the space coordinate converting server, a field video from an image capturing device, wherein the field video is recorded with a 3D object, and the 3D object has a plurality of marked points; generating, by the space coordinate converting server, a point cloud model according to the field video, wherein the point cloud model comprises a plurality of points data; determining, by the space coordinate converting server, a plurality of key frames of the field video, wherein each of the plurality of key frames comprises a key image and a rotation and translation information of the image capturing device; mapping, by the space coordinate converting server, the plurality of points data of the point cloud model to the key image of each of the plurality of key frames based on the corresponding rotation and translation information of the image capturing device of each of the plurality of key frames for generating a 3D coordinate set corresponding to the key image of each of the plurality of key frames.

Next, the method further comprises: determining, by the space coordinate converting server, a plurality of 2D coordinates of the 3D object in the key image of each of the plurality of key frames based on the plurality of marked points, wherein the plurality of 2D coordinates correspond to at least two marked points of the plurality of marked points; selecting, by the space coordinate converting server, a plurality of 3D coordinates from the 3D coordinate set according to the plurality of 2D coordinates, wherein the plurality of 3D coordinates correspond to the at least two marked points; and determining, by the space coordinate converting server, a space coordinate converting relation according to actual point coordinates of the at least two marked points and the plurality of 3D coordinates.

The disclosure also includes a space coordinate converting server. The space coordinate converting server comprises a transmission interface and a processing unit. The transmission interface is configured to receive a field video from an image capturing device, wherein the field video is recorded with a 3D object, and the 3D object has a plurality of marked points. The processing unit is coupled to the transmission interface electrically, and is configured to: generate a point cloud model according to the field video, wherein the point cloud model comprises a plurality of points data; determine a plurality of key frames of the field video, wherein each of the plurality of key frames comprises a key image and a rotation and translation information of the image capturing device; map the plurality of points data of the point cloud model to the key image of each of the plurality of key frames based on the corresponding rotation and translation information of the image capturing device of each of the plurality of key frames for generating a 3D coordinate set corresponding to the key image of each of the plurality of key frames.

Next, the processing unit is further configured to: determine a plurality of 2D coordinates of the 3D object in the key image of each of the plurality of key frames based on the plurality of marked points, wherein the plurality of 2D coordinates correspond to at least two marked points of the plurality of marked points; select a plurality of 3D coordinates from the 3D coordinate set according to the plurality of 2D coordinates, wherein the plurality of 3D coordinates correspond to the at least two marked points; and determine a space coordinate converting relation according to actual point coordinates of the at least two marked points and the plurality of 3D coordinates.

BRIEF DESCRIPTION OF THE DRAWINGS

FIG. 3 is a flowchart diagram of a space coordinate converting method of the third embodiment of the invention; and FIG. 4A and FIG. 4B are flowchart diagrams of a space coordinate converting method of the fourth embodiment of the invention.

DETAILED DESCRIPTION

In the following description, the present invention will be explained with reference to certain example embodiments thereof. However, these example embodiments are not intended to limit the present invention to any specific examples, embodiments, environment, applications or implementations described in these example embodiments. Therefore, description of these example embodiments is only for purpose of illustration rather than to limit the present invention.

In the following embodiments and the attached drawings, elements unrelated to the present invention are omitted from depiction; and dimensional relationships among individual elements in the attached drawings are illustrated only for ease of understanding, but not to limit the actual scale.

Figure 1A:
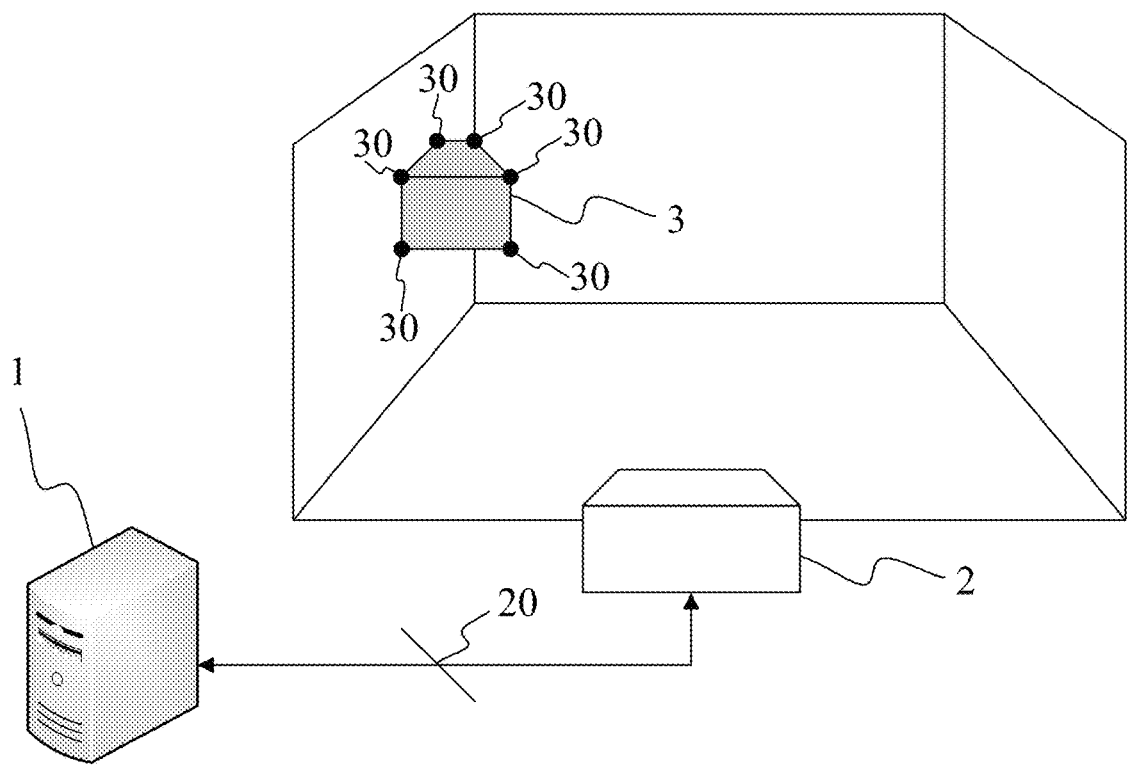
FIG. 1A is a schematic view illustrating the operation of a space coordinate converting server of the first embodiment of the invention.
Figure 1B:
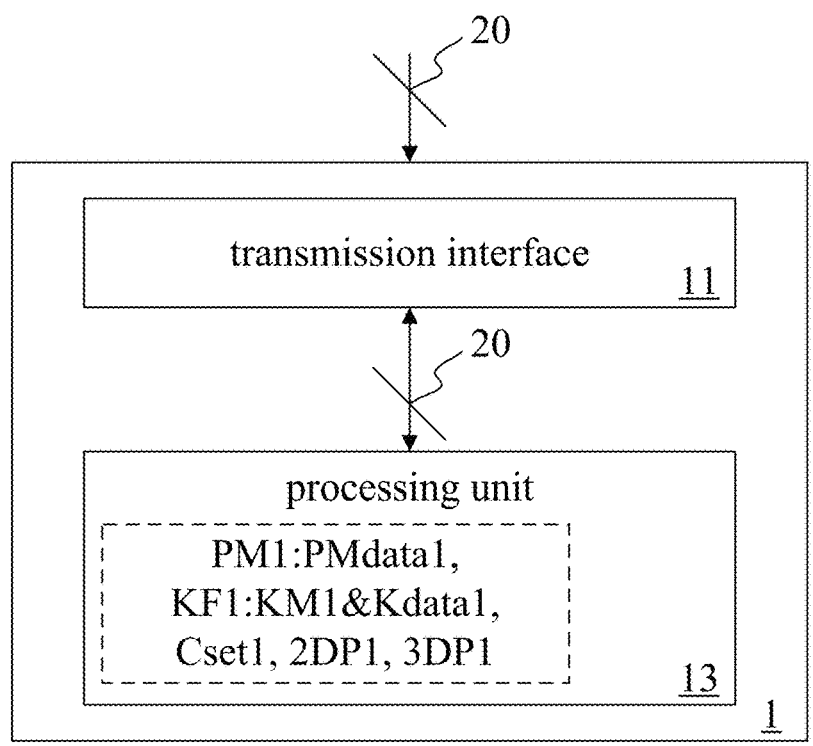
FIG. 1B is a block diagram of the space coordinate converting server of the first embodiment of the invention.

Please refer to FIG. 1A and FIG. 1B together. FIG. 1A is a schematic view illustrating the operation of a space coordinate converting server of the first embodiment of the invention. FIG. 1B is a block diagram of the space coordinate converting server of the first embodiment of the invention. The space coordinate converting server 1 comprises a transmission interface 11 and a processing unit 13. The transmission interface 11 and the processing unit 13 are electrically connected to each other, and the interactions therebetween will be further described hereinafter.

First, as shown in FIG. 1A, the transmission interface 11 of the space coordinate converting server 1 receives a field video 20 from an image capturing device 2. As shown in the figure, the field video 20 is captured by the image capturing device 2 while shooting a specific scene. There is a 3D object 3 set in the specific scene, and the 3D object 3 has a plurality of marked points 30. Therefore, the field video 20 is recorded with the 3D object 3.

Next, the processing unit 13 of the space coordinate converting server 1 first generates a point cloud model PM1 according to the field video 20. The point cloud model PM1 comprises a plurality of points data PMdata1. During the generating process, the processing unit 13 further determines a plurality of key frames KF1 of the field video 20, and each of the plurality of key frames KF1 comprises a key image KM1 and a rotation and translation information of the image capturing device Kdata1. It should be appreciated that the rotation and translation information of the image capturing device Kdata1 is the rotation and translation information of the image capturing device 2 while the image capturing device 2 captures the key image KM1.

Thereafter, for each of the plurality of key frames KF1, the processing unit 13 maps the plurality of points data PMdata1 of the point cloud model PM1 to the key image KM1 of each of the plurality of key frames KF1 based on the corresponding rotation and translation information of the image capturing device Kdata1 of the key frame KF1. As a result, a 3D coordinate set Cset1 corresponding to the key images KM1 is derived.

More specifically, since the plurality of points data PMdata1 and the key images KM1 record the data of each of the feature points in the specific scene via 3D format and 2D format respectively, the plurality of points data PMdata1 and the key images KM1 have the same feature points correspondingly. Accordingly, the processing unit 13 generates the 3D coordinate set Cset1 through mapping the plurality of points data Kdata1 to each key image KM1 based on the corresponding rotation and translation information of the image capturing device Kdata1 at the moment of capturing. The 3D coordinate set Cset1 comprises the 3D coordinates corresponding to the feature points of the specific scene recorded by each of the key images KM1.

Furthermore, since the field video 20 is recorded with the 3D object 3, the key image KM1 of the key frames KF1 is recorded with the 3D object 3 as well. Accordingly, the processing unit 13 is capable of determining a plurality of 2D coordinates 2DP1 of the plurality of marked points 30 of the 3D object 3 in different key images KM1 of the key frames KF1 based on the plurality of marked points 30 of the 3D object 3.

It shall be particularly appreciated that, due to the different capturing angles and scopes, the key image may comprise different number of the marked points of the 3D object. In the first embodiment, the 3D object 3 is a cube, and the plurality of 2D coordinates 2DP1 correspond to at least two marked points of the plurality of marked points 30. In addition, the marked points may mainly be the vertices of the 3D object, and the identification of each of the vertices may be completed in the way of setting different identified patterns for different surfaces of the 3D object.

Afterward, the processing unit 13 selects a plurality of 3D coordinates 3DP1, which have high correspondences, from the 3D coordinate set Cset1 according to the plurality of 2D coordinates 2DP1. As a result, the plurality of 3D coordinates 3DP1 correspond to the at least two marked points of the plurality of marked points 30. Eventually, according to the actual point coordinates (which can be provided by users directly) of the at least two marked points of the plurality of marked points 30 and the plurality of 3D coordinates 3DP1, the processing unit 13 determines a space coordinate converting relation (which is not shown in the figures) to facilitate the conversion between the virtual coordinates and the actual coordinates.

Figure 2A:
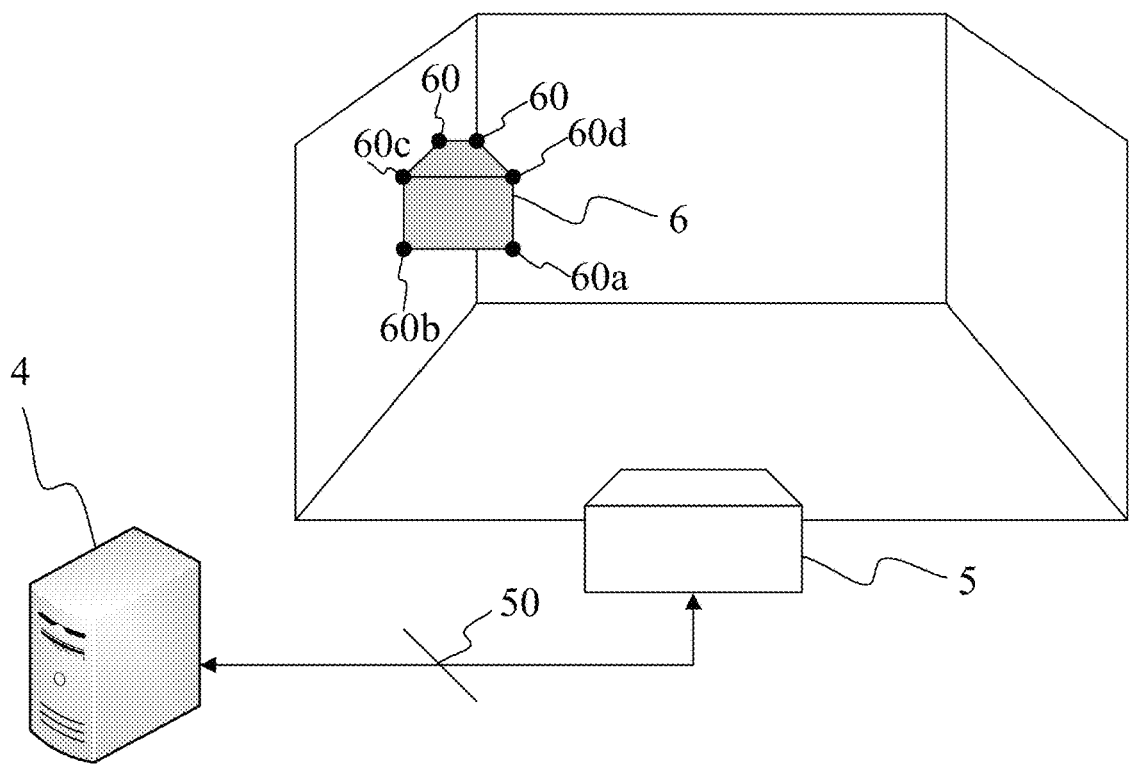
FIG. 2A is a schematic view illustrating the operation of a space coordinate converting server of the second embodiment of the invention.
Figure 2B:
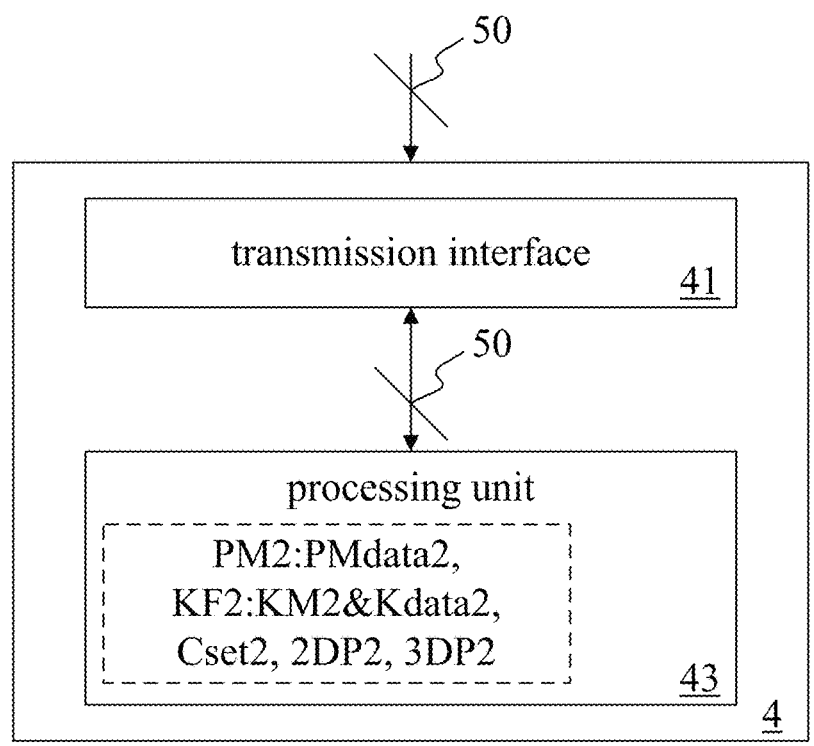
FIG. 2B is a block diagram of the space coordinate converting server of the second embodiment of the invention.

Please refer to FIG. 2A and FIG. 2B together. FIG. 2A is a schematic view illustrating the operation of a space coordinate converting server 4 of the second embodiment of the invention. FIG. 2B is a block diagram of the space coordinate converting server 4 of the second embodiment of the invention. The space coordinate converting server 4 comprises a transmission interface 41 and a processing unit 43. The transmission interface 41 and the processing unit 43 are electrically connected to each other. The second embodiment further illustrates the details of the operations of the space coordinate conversion in the present invention.

First, as shown in FIG. 2A, the transmission interface 41 of the space coordinate converting server 4 receives a field video 50 from an image capturing device 5. As shown in the figure, the field video 50 is captured by the image capturing device 5 while shooting a specific scene. There is a 3D object 6 set in the specific scene, and the 3D object 6 has a plurality of marked points 60. Therefore, the field video 50 is recorded with the 3D object 6.

Next, the processing unit 43 of the space coordinate converting server 4 generates a point cloud model PM2 according to the field video 50 first. The point cloud model PM2 comprises a plurality of points data PMdata2. During the generating process, the processing unit 43 further determines a plurality of key frames KF2 of the field video 50, and each of the plurality of key frames KF2 comprises a key image KM2 and a rotation and translation information of the image capturing device Kdata2. It should be appreciated that the rotation and translation information of the image capturing device Kdata2 is the rotation and translation information of the image capturing device 5 while the image capturing device 5 captures the key image KM2.

It shall be particularly appreciated that, in the second embodiment, the point cloud model PM2 is generated based on the simultaneous localization and mapping (SLAM) technology (for example, ORB-SLAM), which shall be well-appreciated by those skilled in the art, and thus will not be further described herein.

Thereafter, for each of the plurality of key frames KF2, the processing unit 43 maps the plurality of points data PMdata2 of the point cloud model PM2 to the key image KM2 of each of the plurality of key frames KF2 based on the corresponding rotation and translation information of the image capturing device Kdata2 of the key frame KF2. As a result, a 3D coordinate set Cset2 corresponding to the key images KM2 is derived. Similarly, the 3D coordinate set Cset2 comprises the 3D coordinates corresponding to the feature points of the specific scene recorded in each of the key images KM2.

Furthermore, since the field video 50 is recorded with the 3D object 6, the key image KM2 of the key frames KF2 is recorded with the 3D object 6 as well. Accordingly, the processing unit 43 is capable of determining a plurality of 2D coordinates 2DP2 of the plurality of marked points 60 of the 3D object 6 in different key images KM2 of the key frames KF2 based on the plurality of marked points 60 of the 3D object 6. It shall be particularly noted that, in the second embodiment, the 3D object 6 is a cube, and the plurality of 2D coordinates 2DP2 correspond to four marked points 60a-60d of the plurality of marked points 60.

Next, the processing unit 43 selects four 3D coordinates 3DP2, which have high correspondences, from the 3D coordinate set Cset2 according to the plurality of 2D coordinates (for example, the 3D coordinates which have the projection points nearest to the 2D coordinates 2DP2 are selected). As a result, the 3D coordinates 3DP2 correspond to the four marked points 60a-60d.

Thereafter, the processing unit 43 calculates an actual central coordinate (not shown in the figures) according to the actual point coordinates (which are provided by user) of the four marked points 60a-60d of the 3D object 6, and calculates four actual distances between the four marked points 60a-60d and the actual central coordinate respectively. On the other hand, the processing unit 43 calculates a reference central coordinate (not shown in the figures) according to the plurality of 3D coordinates 3DP2, and calculates a plurality of reference distances between the plurality of 3D coordinates 3DP2 and the reference central coordinate respectively. Accordingly, the processing unit 43 may calculate a space ratio according to the plurality of actual distances and the plurality of reference distances. The space ratio is a ratio of an average distance of the plurality of actual distances to an average distance of the plurality of reference distances.

Moreover, the processing unit 43 further calculates a space rotation matrix (not shown in figures) and a space translation matrix (not shown in figures) according to the plurality of actual point coordinates of the four marked points 60a-60d, the plurality of 3D coordinates 3DP2 and the space ratio, and determines a space coordinates converting relation (not shown in figures) based on the space rotation matrix, the space translation matrix or the combination of both matrices. The space coordinate converting relation comprises the space rotation matrix, the space translation matrix, or the combination of both matrices. As a result, the conversion between the coordinates of virtual space and the coordinates of actual space can be completed through the space rotation matrix, the space translation matrix, or the combination of both matrices.

It shall be particularly appreciated that, the processing unit 43 is capable of calculating the mentioned matrix for the actual point coordinates of the marked points, the plurality of 3D coordinates, and the space ratio based on singular value decomposition (SVD) or random sample consensus (RANSAC), which shall be well-appreciated by those skilled in the art, and thus will not be further described herein.

Besides, the transmission interface of the aforesaid embodiments may be a physical transmission circuit or a wireless network transceiver, and the processing unit may be one of: a central processing unit (CPU); other hardware circuit elements capable of executing relevant instructions; or other computing circuits that shall be well-appreciated by those skilled in the art based on the disclosure of the present invention. However, it is not intended to limit the hardware implementation embodiments of the present invention.

The third embodiment of the present invention provides a space coordinate converting method, and please refer to FIG. 3 for the flowchart diagram of the method. The method of the third embodiment is used for a space coordinate converting server (for example, the space coordinate converting servers in said embodiments). The details of the steps of the third embodiment are described below.

First, step 301 is executed to receive, by the space coordinate converting server, a field video from an image capturing device. The field video is recorded with a 3D object, and the 3D object has a plurality of marked points. Step 302 is executed to generate, by the space coordinate converting server, a point cloud model according to the field video. The point cloud model comprises a plurality of points data. Step 303 is executed to determine, by the space coordinate converting server, a plurality of key frames of the field video. Each of the plurality of key frames comprises a key image and a rotation and translation information of the image capturing device.

Next, step 304 is executed to map, by the space coordinate converting server, the plurality of points data of the point cloud model to the key image of each of the plurality of key frames based on the corresponding rotation and translation information of the image capturing device of each of the plurality of key frames for generating a 3D coordinate set corresponding to the key image of each of the plurality of key frames. Step 305 is executed to determine, by the space coordinate converting server, a plurality of 2D coordinates of the 3D object in the key image of each of the plurality of key frames based on the plurality of marked points. The plurality of 2D coordinates correspond to at least two marked points of the plurality of marked points.

Thereafter, step 306 is executed to select, by the space coordinate converting server, a plurality of 3D coordinates from the 3D coordinate set according to the plurality of 2D coordinates. The plurality of 3D coordinates correspond to the at least two marked points. At last, step 307 is executed to determine, by the space coordinate converting server, a space coordinate converting relation according to actual point coordinates of the at least two marked points and the plurality of 3D coordinates.

Figure 4B:
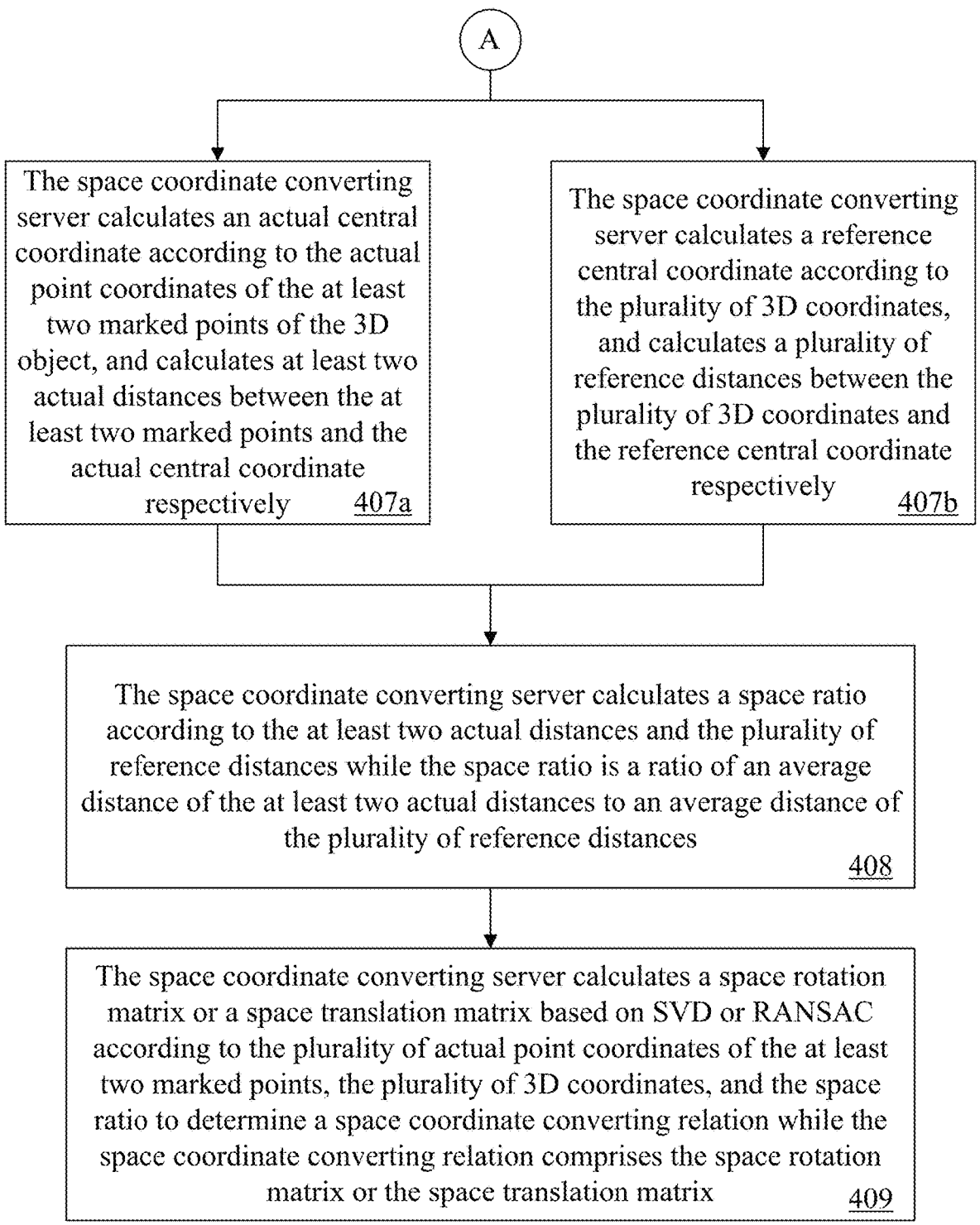

The fourth embodiment of the present invention provides a space coordinate converting method, and please refer to FIG. 4A and FIG. 4B for the flowchart diagram of the method. The method of the fourth embodiment is used for a space coordinate converting server (for example, the space coordinate converting servers in said embodiments). The details of the steps of the fourth embodiment are described below.

First, step 401 is executed to receive, by the space coordinate converting server, a field video from an image capturing device. The field video is recorded with a 3D object, and the 3D object has a plurality of marked points. Step 402 is executed to generate, by the space coordinate converting server, a point cloud model according to the field video based on SLAM technology. The point cloud model comprises a plurality of points data. Step 403 is executed to determine, by the space coordinate converting server, a plurality of key frames of the field video. Each of the plurality of key frames comprises a key image and a rotation and translation information of the image capturing device.

Next, step 404 is executed to map, by the space coordinate converting server, the plurality of points data of the point cloud model to the key image of each of the plurality of key frames based on the corresponding rotation and translation information of the image capturing device of each of the plurality of key frames for generating a 3D coordinate set corresponding to the key image of each of the plurality of key frames. Step 405 is executed to determine, by the space coordinate converting server, a plurality of 2D coordinates of the 3D object in the key image of each of the plurality of key frames based on the plurality of marked points. The plurality of 2D coordinates correspond to at least two marked points of the plurality of marked points. Step 406 is executed to select, by the space coordinate converting server, a plurality of 3D coordinates from the 3D coordinate set according to the plurality of 2D coordinates. The plurality of 3D coordinates correspond to the at least two marked points.

Thereafter, step 407a and step 407b are executed. In step 407a, the space coordinate converting server calculates an actual central coordinate according to the actual point coordinates of the at least two marked points of the 3D object, and calculates at least two actual distances between the at least two marked points and the actual central coordinate respectively. In step 407b, the space coordinate converting server calculates a reference central coordinate according to the plurality of 3D coordinates, and calculates a plurality of reference distances between the plurality of 3D coordinates and the reference central coordinate respectively.

Step 408 is executed to calculate, by the space coordinate converting server, a space ratio according to the at least two actual distances and the plurality of reference distances. The space ratio is a ratio of an average distance of the at least two actual distances to an average distance of the plurality of reference distances. Step 409 is executed to calculate, by the space coordinate converting server, a space rotation matrix or a space translation matrix based on SVD or RANSAC according to the plurality of actual point coordinates of the at least two marked points, the plurality of 3D coordinates and the space ratio, and to determine a space coordinate converting relation accordingly. The space coordinate converting relation comprises the space rotation matrix or the space translation matrix.

According to the above descriptions, the space coordinate converting server and method of the present invention significantly increase the reliable of the coordinate conversion by setting and identifying specific 3D objects in the scene. As a result, the present invention decreases the error of converting and aligning space coordinates, increases the accuracy of merging, and improves the shortcomings of the technology in the prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A space coordinate converting method for a space coordinate converting server, comprising:
   receiving, by the space coordinate converting server, a field video from an image capturing device, wherein the field video is recorded with a 3D object, and the 3D object has a plurality of marked points;
   generating, by the space coordinate converting server, a point cloud model according to the field video, wherein the point cloud model comprises a plurality of points data;
   determining, by the space coordinate converting server, a plurality of key frames of the field video, wherein each of the plurality of key frames comprises a key image and a rotation and translation information of the image capturing device;
   mapping, by the space coordinate converting server, the plurality of points data of the point cloud model to the key image of each of the plurality of key frames based on the corresponding rotation and translation information of the image capturing device of each of the plurality of key frames for generating a 3D coordinate set corresponding to the key image of each of the plurality of key frames;
   determining, by the space coordinate converting server, a plurality of 2D coordinates of the 3D object in the key image of each of the plurality of key frames based on the plurality of marked points, wherein the plurality of 2D coordinates correspond to at least two marked points of the plurality of marked points;
   selecting, by the space coordinate converting server, a plurality of 3D coordinates from the 3D coordinate set according to the plurality of 2D coordinates, wherein the plurality of 3D coordinates correspond to the at least two marked points; and
   determining, by the space coordinate converting server, a space coordinate converting relation according to actual point coordinates of the at least two marked points and the plurality of 3D coordinates.

2. The space coordinate converting method of claim 1, wherein the space coordinate converting server generates the point cloud model based on simultaneous localization and mapping technology.

3. The space coordinate converting method of claim 1, wherein the step of the space coordinate converting server determining the space coordinate converting relation further comprises:
   calculating, by the space coordinate converting server, an actual central coordinate according to the actual point coordinates of the at least two marked points of the 3D object, and calculating at least two actual distances between the at least two marked points and the actual central coordinate respectively;
   calculating, by the space coordinate converting server, a reference central coordinate according to the plurality of 3D coordinates, and calculating a plurality of reference distances between the plurality of 3D coordinates and the reference central coordinate respectively;
   calculating, by the space coordinate converting server, a space ratio according to the at least two actual distances and the plurality of reference distances, wherein the space ratio is a ratio of an average distance of the at least two actual distances to an average distance of the plurality of reference distances; and
   calculating, by the space coordinate converting server, a space rotation matrix according to the plurality of actual point coordinates of the at least two marked points, the plurality of 3D coordinates, and the space ratio, wherein the space coordinate converting relation comprises the space rotation matrix.

4. The space coordinate converting method of claim 3, wherein the space coordinate converting server calculates the space rotation matrix based on singular value decomposition or random sample consensus.

5. The space coordinate converting method of claim 1, wherein the step of the space coordinate converting server determining the space coordinate converting relation further comprises:
calculating, by the space coordinate converting server, an actual central coordinate according to the actual point coordinates of the at least two marked points of the 3D object, and calculating at least two actual distances between the at least two marked points and the actual central coordinate respectively;
calculating, by the space coordinate converting server, a reference central coordinate according to the plurality of 3D coordinates, and calculating a plurality of reference distances between the plurality of 3D coordinates and the reference central coordinate respectively;
calculating, by the space coordinate converting server, a space ratio according to the at least two actual distances and the plurality of reference distances, wherein the space ratio is a ratio of an average distance of the at least two actual distances to an average distance of the plurality of reference distances; and
calculating, by the space coordinate converting server, a space translation matrix according to the plurality of actual point coordinates of the at least two marked points, the plurality of 3D coordinates, and the space ratio, wherein the space coordinate converting relation comprises the space translation matrix.

6. The space coordinate converting method of claim 5, wherein the space coordinate converting server calculates the space translation matrix based on singular value decomposition or random sample consensus.

7. A space coordinate converting server, comprising:
a transmission interface, being configured to receive a field video from an image capturing device, wherein the field video is recorded with a 3D object, and the 3D object has a plurality of marked points; and
a processing unit coupled to the transmission interface electrically, being configured to:
generate a point cloud model according to the field video, wherein the point cloud model comprises a plurality of points data;
determine a plurality of key frames of the field video, wherein each of the plurality of key frames comprises a key image and a rotation and translation information of the image capturing device;
map the plurality of points data of the point cloud model to the key image of each of the plurality of key frames based on the corresponding rotation and translation information of the image capturing device of each of the plurality of key frames for generating a 3D coordinate set corresponding to the key image of each of the plurality of key frames;
determine a plurality of 2D coordinates of the 3D object in the key image of each of the plurality of key frames based on the plurality of marked points, wherein the plurality of 2D coordinates correspond to at least two marked points of the plurality of marked points;

select a plurality of 3D coordinates from the 3D coordinate set according to the plurality of 2D coordinates, wherein the plurality of 3D coordinates correspond to the at least two marked points; and
determine a space coordinate converting relation according to actual point coordinates of the at least two marked points and the plurality of 3D coordinates.

8. The space coordinate converting server of claim 7, wherein the space coordinate converting server generates the point cloud model based on simultaneous localization and mapping technology.

9. The space coordinate converting server of claim 7, wherein the processing unit is further configured to:
calculate an actual central coordinate according to the actual point coordinates of the at least two marked points of the 3D object, and calculate at least two actual distances between the at least two marked points and the actual central coordinate respectively;
calculate a reference central coordinate according to the plurality of 3D coordinates, and calculate a plurality of reference distances between the plurality of 3D coordinates and the reference central coordinate respectively;
calculate a space ratio according to the at least two actual distances and the plurality of reference distances, wherein the space ratio is a ratio of an average distance of the at least two actual distances to an average distance of the plurality of reference distances; and
calculate a space rotation matrix according to the plurality of actual point coordinates of the at least two marked points, the plurality of 3D coordinates, and the space ratio, wherein the space coordinate converting relation comprises the space rotation matrix.

10. The space coordinate converting server of claim 9, wherein the space coordinate converting server calculates the space rotation matrix based on singular value decomposition or random sample consensus.

11. The space coordinate converting server of claim 7, wherein the processing unit is further configured to:
calculate an actual central coordinate according to the actual point coordinates of the at least two marked points of the 3D object, and calculate at least two actual distances between the at least two marked points and the actual central coordinate respectively;
calculate a reference central coordinate according to the plurality of 3D coordinates, and calculate a plurality of reference distances between the plurality of 3D coordinates and the reference central coordinate respectively;
calculate a space ratio according to the at least two actual distances and the plurality of reference distances, wherein the space ratio is a ratio of an average distance of the at least two actual distances to an average distance of the plurality of reference distances; and
calculate a space translation matrix according to the plurality of actual point coordinates of the at least two marked points, the plurality of 3D coordinates, and the space ratio, wherein the space coordinate converting relation comprises the space translation matrix.

12. The space coordinate converting server of claim 11, wherein the space coordinate converting server calculates the space translation matrix based on singular value decomposition or random sample consensus.

* * * * *